US008341311B1

(12) United States Patent
Szewerenko et al.

(10) Patent No.: US 8,341,311 B1
(45) Date of Patent: Dec. 25, 2012

(54) SYSTEM AND METHOD FOR REDUCED LATENCY DATA TRANSFERS FROM FLASH MEMORY TO HOST BY UTILIZING CONCURRENT TRANSFERS INTO RAM BUFFER MEMORY AND FIFO HOST INTERFACE

(75) Inventors: Leland Szewerenko, Austin, TX (US); Thomas Branca, Austin, TX (US)

(73) Assignee: Entorian Technologies, Inc, Austin, TX (US)

( * ) Notice: Subject to any disclaimer, the term of this patent is extended or adjusted under 35 U.S.C. 154(b) by 381 days.

(21) Appl. No.: 12/621,486

(22) Filed: Nov. 18, 2009

Related U.S. Application Data

(60) Provisional application No. 61/115,862, filed on Nov. 18, 2008.

(51) Int. Cl.
*G06F 13/00* (2006.01)
(52) U.S. Cl. .............. 710/22; 710/38; 710/52; 711/103; 711/154
(58) Field of Classification Search .................. 710/22, 710/38, 52; 711/103, 154
See application file for complete search history.

(56) References Cited

U.S. PATENT DOCUMENTS

| | | | | |
|---|---|---|---|---|
| 5,325,508 | A | * | 6/1994 | Parks et al. .................. 711/118 |
| 5,459,850 | A | | 10/1995 | Clay et al. |
| 5,519,847 | A | | 5/1996 | Fandrich et al. |
| 5,822,251 | A | * | 10/1998 | Bruce et al. .............. 365/185.33 |
| 5,940,861 | A | | 8/1999 | Brown et al. |
| 6,714,993 | B1 | | 3/2004 | Bhaskaran |
| 6,874,044 | B1 | | 3/2005 | Chou et al. |
| 7,020,724 | B2 | | 3/2006 | Emerson et al. |
| 7,050,191 | B2 | * | 5/2006 | Rao ............... 358/1.16 |
| 7,525,842 | B2 | | 4/2009 | Nguyen et al. |
| 7,542,350 | B2 | | 6/2009 | Park et al. |
| 7,581,057 | B2 | | 8/2009 | Sinclair et al. |
| 7,620,748 | B1 | * | 11/2009 | Bruce et al. ............. 710/22 |
| 2007/0168614 | A1 | * | 7/2007 | Luo et al. ............. 711/115 |
| 2008/0250192 | A1 | | 10/2008 | Pua et al. |
| 2008/0298134 | A1 | | 12/2008 | Kang et al. |
| 2009/0083476 | A1 | | 3/2009 | Pua et al. |
| 2009/0204746 | A1 | | 8/2009 | Chen et al. |

(Continued)

OTHER PUBLICATIONS

Jim Handy, Cache Memory Book, Copyright 1993, Academic Press Inc., entire pages.*

(Continued)

*Primary Examiner* — Hong Kim
(74) *Attorney, Agent, or Firm* — Scheinberg & Associates, PC; Michael O. Scheinberg; Robert J Amedeo

(57) ABSTRACT

A flash memory system having the capability of streaming data directly from flash memory to the interface of a host computer in order to substantially reduce latency of to-host transfers, while also maintaining the capabilities for caching and overlapped flash I/O provided by RAM DMA transfers. When data is read from the flash memory, the data is transferred into the RAM buffer and at the option of the memory controller, directly (via an intermediate FIFO) to the host interface. This results in a desirable reduction in the latency of data transfer because as soon as the first byte of data is read from the flash memory by the DMA engine, the data will be transferred directly to the host interface. Because the data is also being transferred to the buffer RAM, preferred embodiments of the present invention still provide the advantages of using an intermediate transfer buffer.

15 Claims, 3 Drawing Sheets

U.S. PATENT DOCUMENTS

2009/0204748 A1    8/2009   Jang et al.
2009/0240865 A1*   9/2009   Yu et al. .................. 710/316
2009/0265513 A1   10/2009   Ryu
2010/0017556 A1*   1/2010   Chin et al. ............... 711/103
2010/0017650 A1*   1/2010   Chin et al. ............... 714/6
2010/0125695 A1*   5/2010   Wu et al. ................. 711/103

OTHER PUBLICATIONS

Min, Sang Lyul, et al., 'Evolution of NAND Flash Memory Interface,' 2007, pp. 75-79.

* cited by examiner

SYSTEM AND METHOD FOR REDUCED LATENCY DATA TRANSFERS FROM FLASH MEMORY TO HOST BY UTILIZING CONCURRENT TRANSFERS INTO RAM BUFFER MEMORY AND FIFO HOST INTERFACE

This application claims priority from U.S. provisional Application 61/115,862, filed Nov. 18, 2008, which is hereby incorporated by reference.

TECHNICAL FIELD OF THE INVENTION

This application relates to the operation of re-programmable, non-volatile memory systems such as semiconductor flash memory, and, more specifically, to streaming data from flash memory to a host computer.

BACKGROUND AND SUMMARY OF THE INVENTION

Computers manage information using a combination of information storage methods. Data is stored in different types of memory at different positions in the system, and the time required to access that memory, referred to as "latency," varies with the type of memory. Cache memory on the central processing unit chip provides the fastest CPU access to stored data, but the amount of data that can be stored on the CPU chip is limited. Primary system memory typically includes volatile memory devices that are separate chips, but that are connected to the system bus to provide relatively fast access. Secondary storage devices, such as hard disks and USB drives, can have much larger memory capacity, but because they are not on the system bus, it takes longer to read and write information to such devices.

Information is stored in hard disks essentially as magnetic dots on one or more the circular disks called "platters." Under the CHS address system, the location of each dot is defined by an address comprising three numbers: a cylinder number, a head number, and a sector number. The head number refers to which read/write head reads the disk. Because each read/write head operates on one side of one platter, identifying the head identifies which platter surface the disk the data is stored on. The cylinder number defines which of the concentric rings making up the disk surface the information is stored on. The sector defines where along the ring the data is stored.

Traditional hard drives suffer from a number of disadvantages, such as relatively low mechanical reliability, susceptibility to damage from shock or impact, high energy consumption and heat generation, and relatively slow data access. For example, access times for magnetic disk storage systems are on the order of tens of milliseconds (10,000 microseconds). As a result of these disadvantages, solid-state drives (SSD) are increasingly used as a replacement for hard drive storage devices.

Because they have no moving parts, SSDs are less fragile than hard disks, use less power, and tend to have lower access time and latency. One popular type of SSD is commonly known as flash memory, named in part because a flash operation must be used to erase the content of an entire block of data before it can be re-written. Flash memory is non-volatile (data is not lost when power is disconnected) and the memory can be reprogrammed, read, and erased electronically. In addition, flash memory devices are relatively robust and resistant to damage when subjected to shock, physical impact, high altitude, and extremes of temperature.

Flash memory comprises a number of cells, each of which typically stores a single binary digit or bit of information. A typical flash memory or nonvolatile memory cell comprises a field effect transistor having an electrically isolated floating gate that controls electrical conduction between the source and drain regions of the memory cell. Data is represented by a charge stored on the floating gate, and the resulting conductivity observed between the source and drain regions.

The speed at which the write process works is limited in part by the memory control structure of the memory device, and in part by the amount of time needed to program a memory cell using the electron tunneling process. Writing to flash memory is described in greater detail in U.S. patent application Ser. No. 12/621,222 by Leland Szewerenko for "Solid State Memory System," filed Nov. 18, 2009, which is assigned to the present assignee and incorporated herein by reference. The read speed is limited largely by the time needed to load the read address into the flash memory part, select and access a page of flash memory, and load data from the page into an on-chip buffer so that the desired data can be transferred out of the memory device into a processor, bus, or other electronic component.

A solid-state drive typically has a host interface (such as SATA) and one or more memory (typically Flash) interfaces. On older memory systems, including early magnetic hard drives and some prior art flash drives, data was transferred word-by-word directly from the memory controller to the host interface. On more modern systems, data transferred to the host computer is typically transferred from the non-volatile memory to some kind of buffer memory (usually SRAM or SDRAM) by a Direct Memory Access (DMA) engine. The intermediate transfer into a buffer memory is desirable for many reasons including:

It permits transfers from the host to occur at maximum link speed.

It permits data from the host to be validated before committing to storage.

The intermediate RAM data can be used as a cache to speed up read/write accesses.

On transfers to the host, data can be read from multiple flash interfaces, staged in the RAM, and transferred in order to the host.

The problem with the typical data transfer into a buffer memory, however, is that it results in a lengthy latency period before the data is actually transferred to the host. NAND type flash memory, the type commonly used for mass storage, consists of a set of blocks that in turn consist of a set of pages. Although different sizes may be used, a typical block size would be 256 Kbytes with each block consisting of 64 pages of 4 Kbytes each. There are three basic operations to NAND flash memory: read page, program page, and erase block. The read page operation, given the chip number, the block number, and the page number returns the contents of the addressed page. The transfer from the flash memory page to the flash chip's internal buffer requires about 20 microseconds. Once the read operation has completed, the data within the internal buffer can be transferred a byte at a time across the flash interface to the flash controller. The flash controller will deposit this data into its internal buffer. Assuming, for example, that a 4K block of data is to be transferred to the host, the entire 4K block will then be copied to the RAM buffer, which may take up to 100 microseconds (or more, depending upon the clock rate of the bus between the flash part and the flash controller). Only then can the actual transfer to the host SATA port begin. As a result, the host will not begin to see any data from the flash memory for up to 120 microseconds.

Although this latency period is much better than what can be achieved using traditional hard drives, flash memory access is still far below the ideal transfer rate. The time it takes to access data of a flash drive can thus create a significant bottleneck in the overall performance of a computer system.

What is needed is a method and apparatus for transferring data from multiple flash memories that provides the advantages of using an intermediate transfer into a buffer memory while reducing the latency period before data transfer begins.

SUMMARY OF THE INVENTION

An object of the invention is to provide a flash memory system having the capability of streaming data directly from flash memory to the interface of a host computer in order to substantially reduce latency of to-host transfers, while also maintaining the capabilities for caching and overlapped flash I/O provided by RAM DMA transfers.

The foregoing has outlined rather broadly the features and technical advantages of the present invention in order that the detailed description of the invention that follows may be better understood. Additional features and advantages of the invention will be described hereinafter. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more thorough understanding of the present invention, and advantages thereof, reference is now made to the following descriptions taken in conjunction with the accompanying drawings, in which.

The accompanying drawings are not intended to be drawn to scale. In the drawings, each identical or nearly identical component that is illustrated in various figures is represented by a like numeral. For purposes of clarity, not every component may be labeled in every drawing.

DETAILED DESCRIPTION OF PREFERRED EMBODIMENTS

Figure 1:
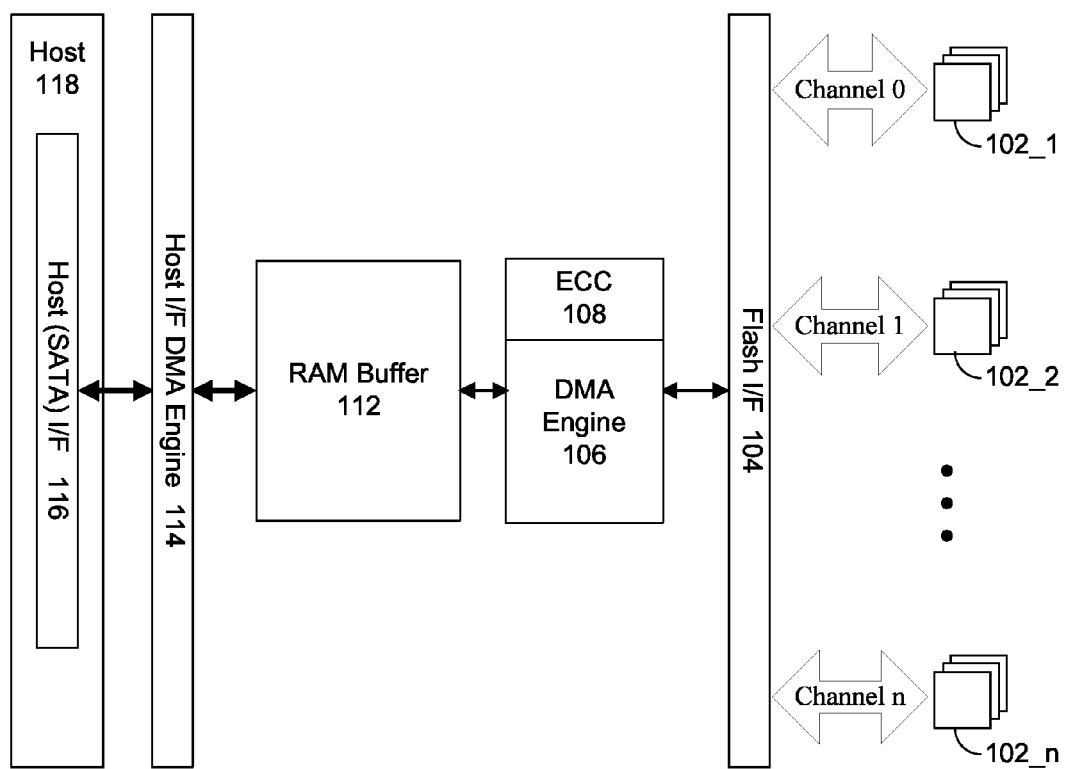
FIG. 1 shows a diagram of the data transfer from a prior art flash memory system to a host computer.

According to preferred embodiments of the present invention, the advantages described above are achieved by placing a "fork" in the data output stream from the flash channel DMA engine. When data is read from the flash memory, the data is transferred into the RAM buffer and at the option of the memory controller, directly (via an intermediate FIFO) to the host interface. The use of a FIFO preferably allows the host interface to access the data as it is being transferred by the flash channel DMA engine (before the transfer has been completed). This results in a desirable reduction in the latency of data transfer because as soon as the first byte of data is read from the flash memory by the DMA engine, the data will be transferred directly to the host interface, such as a SATA port.

The data latency can thus be reduced from 120 microseconds to about 20 microseconds, the latter being the inherent page read delay within the flash part. But because the data is also being transferred to the buffer RAM, preferred embodiments of the present invention still provide the advantages of using an intermediate transfer buffer such as allowing caching of data in the same page as the data requested to improve performance on subsequent requests for the same data; allowing multiple flash interfaces to be used simultaneously; and allowing data transfers from multiple interfaces to be started and to occur simultaneously from flash, while allowing the host interface to begin transfer as soon as possible, and yet maintaining the required ordering of the data.

The host interface DMA engine is preferably provided with the capability to assemble a host transfer from a sequence of data sources, selected in an order specified by the memory controller. This capability allows larger transfers to be assembled from multiple flash interface sources, and allows the FIFO source for a channel to be selected when data from that channel is needed immediately, and the RAM source to be selected when the data is transferred in parallel, or is already resident in RAM.

It will be understood that when an element is referred to as being "connected" or "coupled" to another element, it can be directly connected or coupled to the other element or intervening elements may be present. Likewise, when data is referred to as being transferred between two elements, it can be transferred only between those two elements or it may be also transferred to intervening elements. As used herein, when data is referred to as being directly transferred from flash memory to the host interface, it is meant that the data is not first placed entirely in a RAM buffer memory but is rather streamed continuously from the flash memory to the host interface even though the data passes through intervening elements such as a FIFO. When data is referred to as being transferred, this does not mean that the data is actually removed from the original location.

In the present description, the term "RAM" is used to mean volatile random access memory, whether on the memory controller chip or on a system bus. The term "flash" is used to refer to any non-volatile, solid state, electrically erasable memory, including NAND and NOR-type memories, in which memory cells must be erased in blocks rather than individual addresses. The term "host" or "host computer" is used to refer to the central processing unit or units that initiate read and write commands to the memory controller subsystem.

Figure 2:
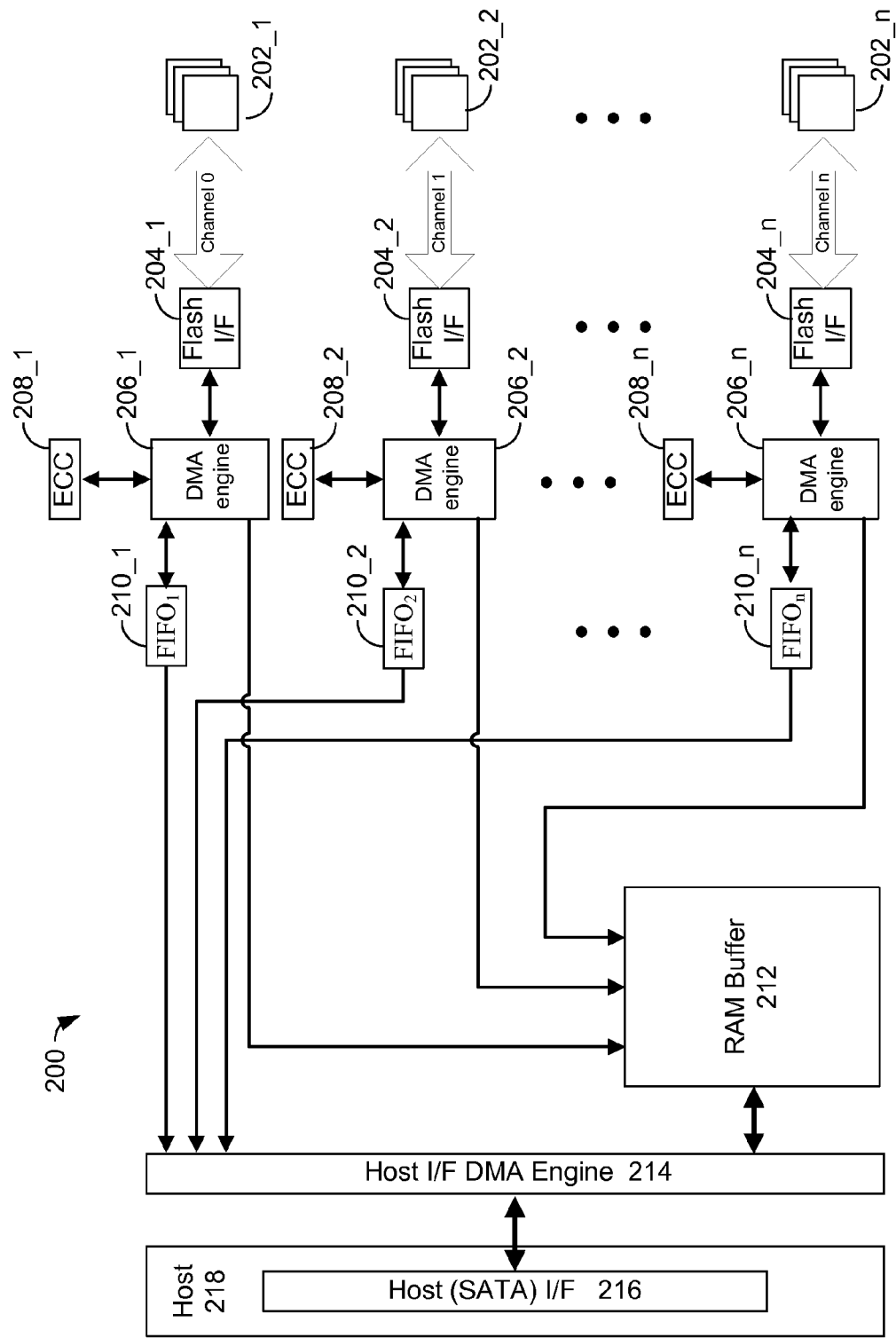
FIG. 2 shows a diagram of the data transfer from a flash memory system to a host computer according to a preferred embodiment of the present invention.

FIG. 2 shows a block diagram of the data flow from a flash memory system 200 to a host interface according to an exemplary embodiment of the present invention. As depicted, the system 200 may include a host 218, volatile memory in the form of a RAM containing multiple page buffers 212, and flash memory 202, such as NAND flash memory. Host 218 can comprise any type of processor, including a central processing unit (CPU), a digital signal processor (DSP), a microcontroller unit (MCU) or a direct memory access (DMA) data transmission device. In a preferred embodiment, RAM 212 comprises a plurality of RAM buffers, each preferably of the same size as the flash pages used by the system. RAM buffer memory 212 may include any type of DRAM, SRAM, or any other type of volatile memory. Flash memory 202 can comprise any type of NAND flash memory, NOR flash memory, programmable read-only memory (PROM), electrically-erasable programmable read-only memory (EE-PROM), read-only memory (ROM), or any other type of non-volatile memory.

In some cases, the system may contain multiple host processors, multiple volatile memories, and multiple non-volatile memories. Further, each of the above described components may include multiple types of processors and/or memories. For example, the host may include a CPU, DSP, and SRAM. The non-volatile memory may, in some cases, include a ROM and a flash memory. Other exemplary combinations which may be used with embodiments of the invention should be readily apparent to one of ordinary skill in the art.

In order to "read" data stored in flash memory, the memory controller preferably initiates a transfer of data from the non-volatile flash memory 202 using direct memory access (DMA). DMA allows a portion of memory to be quickly and automatically moved from one storage location to another storage location without having to go through the memory controller's microprocessor. System 200 can comprise a plurality of non-volatile flash memories 202_1 to 202_n; each flash memory can comprise multiple flash devices or parts. Preferably, each flash memory has a flash interface 204 and a dedicated DMA engine 206 (discussed in greater detail below). To conserve hardware and reduce connectivity, multiple flash parts or devices may be connected to a single flash channel. When connected serially on the flash channel, one flash part is selected for access by using its chip enable signal, which is wired uniquely to the flash interface. When connected in parallel, flash parts are accessed simultaneously, a group of 4 parallel 8-bit flash parts forming a 32-bit wide flash channel, for example. As shown in FIG. 2, multiple flash memories 202_1 to 202_n are each connected to corresponding dedicated DMA engines 206_1 to 206_n through flash interfaces 204_1 to 204_n and multiple flash channels (O-n). A suitable DMA engine should have the capability of direct transfer of contiguous memory and also the capability for gathering scattered non-contiguous memory that has been mapped as contiguous memory space.

Figure 3:
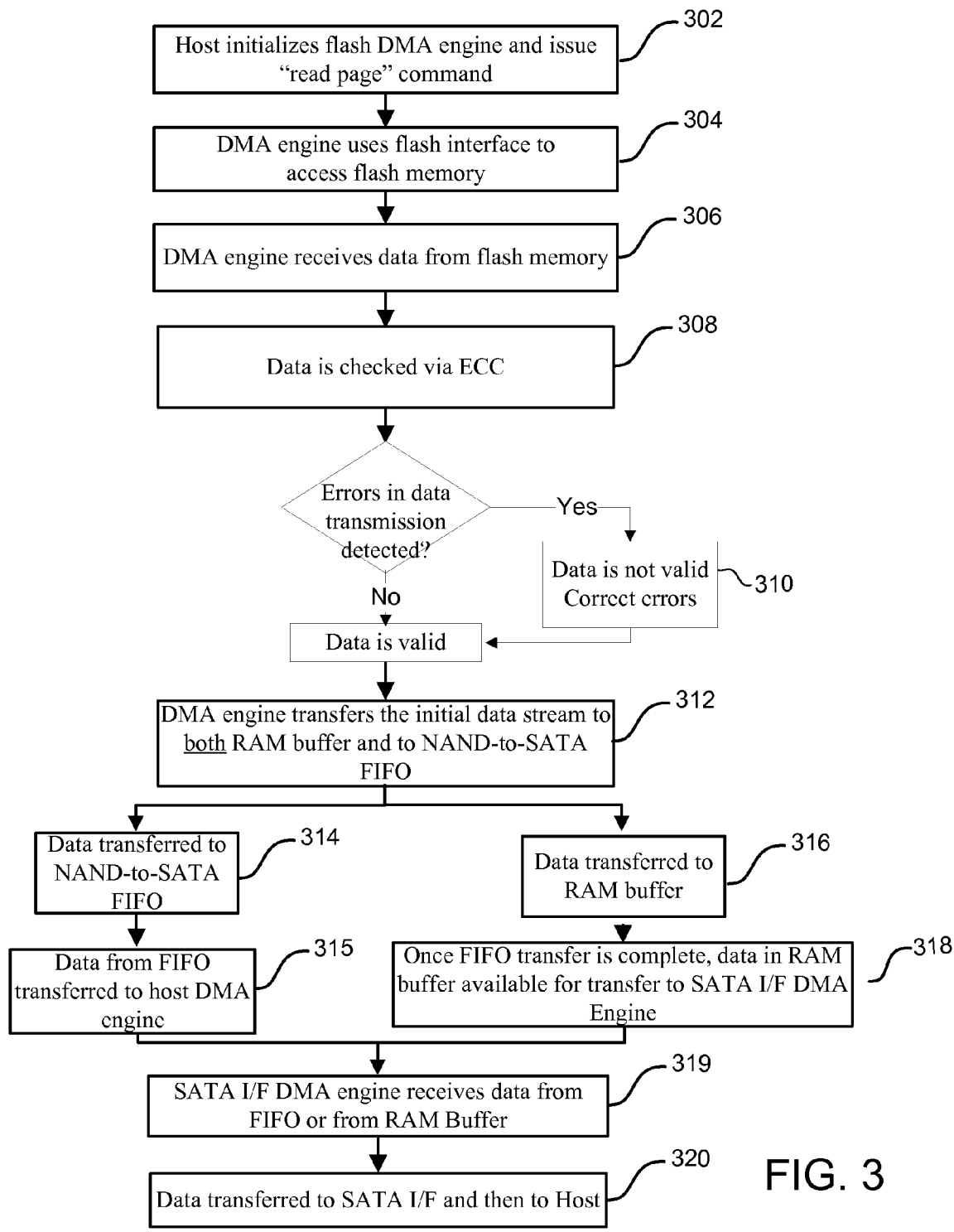
FIG. 3 is a flow chart of a data read according to a preferred embodiment of the present invention.

This DMA transfer can be controlled by a DMA engine 206. As shown in FIG. 3, to perform the DMA transfer, in step 302, the memory controller will typically initialize the DMA engine and issue a "Read Page" command to one or more DMA engines to begin transferring the data from the flash memory. In step 304, DMA engine 206 may then utilize the NAND flash interface 204 to access the NAND flash memory 202. In step 306, the data is received from the flash memory 202 by the DMA engine 206. In step 308, error checking and correction utilities (ECC) 208 may be used to ensure that data received from the NAND flash memory 202 has been correctly transmitted. If errors are found, the ECC utilities attempt to repair the data and correct errors in the transmission in step 310. An inline, on-the-fly ECC unit for each flash interface is preferable since it allows for the correction of errors prior to the potential creation of multiple copies of the data in RAM and the associated FIFOs.

In prior art flash drives, the data would then be copied to a volatile memory buffer before being transmitted to the host interface. In older memory systems, the data was transferred directly to the host interface without using a RAM buffer. According to exemplary embodiments of the present invention, DMA engine 206 transfers the initial data stream to both a RAM buffer 212 and directly to the host interface, for example a SATA interface, in step 312. Direct transfer to the host interface is preferably accomplished in step 314 by using each DMA engine using corresponding NAND-to-SATA FIFO (first-in-first-out) memory 208_1 to 208_n, which the DMA engine can fill with a copy of data read, for selected portions of the data read (in addition to writing said data to the buffer RAM). In step 315, data from FIFO memory can then be transferred to the host interface, such as a SATA interface, by way of a host interface DMA engine 214.

At the same time that flash data is being transferred directly to the host interface, data is also being transferred from flash memory to buffer RAM 212. For transfers where the data is accessed through the same flash channel, the data retrieved from the flash memory is transferred in parallel to both the FIFO buffer and to a RAM buffer. A copy of the data is thus preserved in cache. Although this same data is transferred directly to the host interface via the FIFO, it is still advantageous to maintain the stored copy in the RAM buffer because it is common for a host computer to request the same data multiple times. Subsequent requests can be fulfilled much faster than the initial transfer due to the copy of the data stored in the RAM buffer. Thus, by allowing caching in RAM of data in the same page as the data requested, performance on subsequent requests can be greatly improved.

For transfers in which the data resides in more than one flash page, subsequent data may reside on a different flash device, which is accessible through a different channel and DMA engine. As a result, in step 316, data on a subsequent page can be placed in a RAM buffer (preferably a second RAM page buffer) at the same time that previous data is being transferred directly to the host interface (and thus to the host). Transfer out of the RAM buffer is typically much faster than the transfer from flash memory. For appropriately overlapped read transfers, this subsequent data will be immediately available to be transferred to the host interface in step 318 when the direct thru-FIFO portion of the transfer is completed. In step 319, the host interface DMA engine receives the data from the NAND-to-SATA FIFO or from the RAM page buffer. Host interface DMA engine 214 is preferably capable of selecting data either from the buffer RAM 212 or from a FIFO 210_n associated with a specific flash channel. In contrast to the FIFO memory described above, the "write" process to RAM will have to be completed before the RAM data can be transferred to the host interface by the host interface DMA engine. Finally, in step 320, the data is transferred to the host interface (for example, the SATA I/F) and then to the host computer.

The system described above allows for the scheduling and overlapping of data transfers in cases where there is a speed disparity between the flash and host interfaces. Preferred embodiments of the present invention utilize a flow-control mechanism for the DMA that is capable of throttling the transfer of data from flash should either the FIFO (if selected) or the RAM data transfers become backed up.

In a typical read operation, for example, the host "Read" command might call for the transfer of 4 Kbytes of data. Because the effective width of the flash page may be 8 or 16 Kbytes (on a 16-bit or 32-bit parallel flash channel, respectively), while 4 Kbytes of data is transferred to the host interface through the FIFO, the remaining 4 or 12 Kbytes can be transferred to the RAM buffer. If, as is the case for a high percentage of actions, the host then requests the next 4 Kbytes of data, the transfer from RAM buffer will be almost instantaneous. In some preferred embodiments of the present invention, additional flash DMA engines can transfer additional data (from different channels) to additional RAM page buffers. Once the FIFO to host interface transfer is completed, the data stored in the additional RAM page buffers can all be very rapidly transferred to the host interface. In this example, using a preferred embodiment of the present invention not only decreases the latency time between data being read from flash and transferred to the host, but also cuts the total transfer time nearly in half (for two pages) or even further (for more than two pages).

Preferred embodiments of the present invention also allow multiple flash interfaces to be used simultaneously. The host interface DMA engine can perform a gather operation on data, so that a single transfer to the host may be composed of data from multiple sources (such as multiple flash channels). This allows data transfers from multiple interfaces to be started and to occur simultaneously from flash, while allowing the host interface to begin transfer as soon as possible, and yet maintaining the required ordering of the data. For example, the first data for a read may come from a first flash channel, and be streamed directly into the FIFO and from the FIFO out to the host interface. Simultaneously, the subsequent data can be read from a second flash channel and deposited in RAM buffer (also from a third flash channel deposited in a different RAM page buffer, etc.). The host interface can transfer the data from the RAM page buffer(s) immediately upon completion of the first part of the transfer.

To improve the likelihood of parallelism in transfers, host data is transferred to flash in units of flash pages. Multiple pages of host data are written in a pattern rotating across the flash memory channels. As a result, the first page might be written to channel 0, the next to channel 1, then channel 2, then channel 0 (on a different row of chips), etc. That means when data is read out, subsequent pages will likely be on different flash memory channels. In preferred embodiments of the present invention having an independent DMA engine for each flash interface, data transfers from multiple channels can be started simultaneously. The DMA engine for the leading data bits will transfer the data directly to the host interface (via FIFO and the host interface DMA engine). The other channels will transfer straight to RAM buffer (preferably to different RAM page buffers). These transfers will all complete at approximately the same time, so that by the time the data from the first flash memory page has been streamed to the host interface, all the remaining data is stored in the RAM buffer (possibly in multiple RAM page buffers) where it can be very rapidly transferred to the host interface in the proper order.

According to preferred embodiments of the present invention, scheduling of transfers is typically controlled by a microprocessor within the memory controller. An exemplary DMA engine programming interface suitable for implementing preferred embodiments of the present invention will now be described.

First, the NAND Flash DMA descriptor is modified to indicate when the Flash read data should be pushed to both the RAM buffer and the host interface DMA engine. A field would be added to the NAND Flash Channel DMA Descriptor that when set to a '1' indicates that the Read Transfer Engine should push the read data to the RAM buffer as well as to a NAND-to-SATA FIFO (in this exemplary embodiment the host interface is a SATA interface). When this bit field is set to '1' and the descriptor describes a Flash Read, all data transfers except for the spare data words for the descriptor will be pushed to the NAND-to-SATA FIFO in parallel to pushing the data words to the RAM buffer. Transfers to RAM buffer and the NAND-to-SATA FIFO will continue until the descriptor has transferred all its required data. If the NAND-to-SATA FIFO or the RAM Controller flow control the transaction then the read transfer will temporarily stall until the flow control situation has been resolved.

A NAND-to-SATA FIFO, for example a 4K FIFO, will be added to the NAND Flash Channel module that can interconnect to the SATA module. This 4K FIFO is written to in parallel with the RAM buffer for DMA Read transactions when bit 12 of Status/Control Data Word of the NAND Flash Descriptor is set as described below. A FIFO read interface will be added to the top-level of the NAND Flash Channel controller.

The description for bit 12 of Status/Control Data Word of the NAND Flash Descriptor will be modified as follows:

12—Push to NAND-to-SATA FIFO.

If this bit is set to a '1' and the direction indicates a DMA Read then the Main Read Data should be transferred to the NAND-to-SATA FIFO as well as the RAM buffer. If this bit is set to a '0' and direction indicates a DMA read then the Main Read Data should be transferred only to the RAM buffer. If the direction indicates a DMA Write this bit will be ignored.

The SATA DMA descriptor is modified to indicate the data source for SATA DMA transfers to the host. A field is added to indicate when the SATA controller should transfer data either from the RAM buffer controller or from one of the NAND-to-SATA FIFO interfaces to the SATA Transmit FIFO.

For an example case of 3 flash channels, the Description for bits 6:7 of Control Data Word of the SATA DMA Descriptor is modified as follows:

6:7—DMA Write Data Source.

If these bits are set to a non-zero value and the DMA direction bit is set to '0' then the data source will be from a NAND Flash Channel to SATA FIFO. If these bits are set to zero and the DMA direction bit is set to '0' then data source will be from the RAM buffer. If the DMA direction bit is set to '1' then these bits are ignored.

When DMA direction bit is set to '0' then the 2-bit field has the following meaning:

"00"_Data Source is from RAM buffer (the current operation)

"01"_Data Source is from NAND-to-SATA FIFO interface for Flash Channel 0 (Constant 0's if Flash Channel 0 doesn't exist).

"10"_Data Source is from NAND-to-SATA FIFO interface for Flash Channel 1 (Constant 0's if Flash Channel 1 doesn't exist).

"11"_Data Source is from NAND-to-SATA FIFO interface for Flash Channel 2 (Constant 0's if Flash Channel 2 doesn't exist).

Implementation of these features in the hardware would be straightforward and could be made by a person of ordinary skill in the art without undue experimentation.

The invention has broad applicability and can provide many benefits as described and shown in the examples above. The embodiments will vary greatly depending upon the specific application, and not every embodiment will provide all of the benefits and meet all of the objectives that are achievable by the invention. Although the description of the present invention above is mainly directed at a method of transferring data from flash memory to a host computer, it should be recognized that an apparatus performing the operation of this method would further be within the scope of the present invention.

In the discussion herein and in the claims, whenever the terms "automatic," "automated," or similar terms are used herein, those terms will be understood to include manual initiation of the automatic or automated process or step. Further, the terms "including" and "comprising" are used in an open-ended fashion, and thus should be interpreted to mean "including, but not limited to . . . " It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, operations, elements, and/or components, but do not preclude the presence or addition of one or more other features, operations, elements, components, and/or groups thereof.

Note that some portions of the detailed description above are presented in terms of symbolic representations of operations on data bits within a computer memory. This type of description is the technique by which those skilled in the art most effectively convey the substance of their work to others in the art. However, the techniques actually describe the physical manipulation of physical quantities. Usually, though not necessarily, these quantities are electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Unless specifically stated otherwise as apparent from the following discussions, it is appreciated that throughout the present invention, discussions utilizing terms such as "processing," "computing," "calculating," "determining," "accessing," "displaying," or the like, refer to the action and processes of a computer system, or similar electronic computing device. These actions and processes manipulate and transform data represented as physical (electronic) quantities within the computer system's registers and memories into other data similarly represented as physical quantities within the computer system memories or registers or other such information storage, transmission or display devices.

To the extent that any term is not specially defined in this specification, the intent is that the term is to be given its plain and ordinary meaning. The accompanying drawings are intended to aid in understanding the present invention and, unless otherwise indicated, are not drawn to scale. Certain embodiments of the present invention are described herein with reference to flowchart diagrams. It will be understood that in some embodiments, the operations noted in the flowcharts may occur out of the order noted in the flowcharts. For example, two blocks shown in succession may in fact be executed substantially concurrently or the blocks may sometimes be executed in the reverse order, depending upon the operations involved. Moreover, the functionality of one or more blocks may be separated and/or combined with that of other blocks.

Although the present invention and its advantages have been described in detail, it should be understood that various changes, substitutions and alterations can be made to the embodiments described herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

We claim as follows:

1. A flash memory device comprising:
a first flash memory for storing non-volatile data for a host;
a host interface for transferring data to the host;
a random-access memory (RAM) for storing data from the flash memory that are to be transferred to the host;
a first-in-first-out memory (FIFO) for receiving data from the flash memory;
a first flash direct-memory access (DMA) engine for receiving and transferring data among the first flash memory, the RAM, and the FIFO, the first flash DMA engine operably connected to the first flash memory via a first flash channel and the flash DMA engine being programmed to transfer data from the first flash memory to the host by transferring data from the first flash memory to the FIFO while simultaneously transferring the data from the first flash memory to RAM; and
a host interface DMA engine for receiving and transferring data among the host interface, RAM, and the FIFO, the host interface DMA engine being programmed to transfer data from the FIFO to the host interface as soon as data is transferred to the FIFO by the first DMA engine and to transfer data from the RAM once the transfer of data from the FIFO has been completed.

2. The device of claim 1 in which the RAM comprises multiple, separately accessible page buffers and in which transferring data from the first flash memory to RAM comprises transferring data from the first flash memory to a first RAM page buffer.

3. The device of claim 2 further comprising:
a second flash memory for storing non-volatile data for a host;
a second flash direct-memory access (DMA) engine for receiving and transferring data among the second flash memory and the RAM, the second flash DMA engine operably connected to the second flash memory via a second flash channel and the second flash DMA engine being programmed to transfer data from the second flash memory to a second RAM page buffer while the first DMA engine is transferring data from the first flash memory.

4. The device of claim 3 in which the host interface DMA engine is capable of assembling a data transfer to the host interface from a sequence of data transfers from the FIFO and the multiple RAM page buffers.

5. The device of claim 3 further comprising:
one or more additional flash memories for storing non-volatile data for a host;
one or more additional direct-memory access (DMA) engines for receiving and transferring data among the one or more additional flash memories and one or more additional RAM page buffers, the one or more additional flash DMA engines operably connected to corresponding one or more additional flash memories via one or more additional flash channels and the one or more additional flash DMA engines being programmed to transfer data from the one or more additional flash memories to one or more additional RAM page buffers while the first DMA engine is transferring data from the first flash memory to the FIFO and to the first RAM page buffer.

6. The device of claim 3 in which the data transferred by the first flash DMA engine and the data transferred by the second DMA engine are sequential portions of one block of data from flash memory.

7. The device of claim 3 in which the data transferred by the first flash DMA engine is a first portion of the data and the data transferred by the second DMA engine is a second portion of the data.

8. The device of claim 7 in which the first portion of data is the data needed immediately by the host and the second portion is sequential data.

9. The device of claim 1 in which transmitting the data through a first-in-first-out memory comprises streaming the data through the FIFO so that only a part of the first portion of the data is stored in the FIFO at any time.

10. The device of claim 1 in which the flash DMA engine is capable of direct transfer of contiguous memory from the flash memory and also the capability of gathering scattered non-contiguous memory that has been mapped as contiguous memory space in the flash memory.

11. The device of claim 1 further comprising an error connection circuit for detecting errors in data transferred from flash memory storage before the data is transferred to the FIFO or RAM.

12. The device of claim 1 in which the host interface comprises a SATA interface.

13. The device of claim 1 in which the flash memory comprises NAND flash memory, NOR flash memory, programmable read-only memory (PROM), electrically-erasable programmable read-only memory (EE-PROM), or read-only memory (ROM).

14. A nonvolatile memory system comprising:
a plurality of nonvolatile memory devices comprising a plurality of nonvolatile memory devices each connected to the system via a different corresponding flash channel;
a host interface;
a buffer memory; and
a circuit comprising, for each flash channel, a dedicated flash DMA engine for transferring data from each nonvolatile memory device connected to said flash channel;
wherein said host interface is coupled to said circuit and is enabled to receive data from the circuit and transfer the data to a host,
wherein said buffer memory is coupled to said circuit and is enabled to receive data from the circuit and transfer the data to a host,
wherein said circuit is coupled to each of the plurality of nonvolatile memory devices and is enabled to:
(i) stream data from a nonvolatile memory device to the host interface via a first-in-first out memory;
(ii) concurrently transfer data from a nonvolatile memory device to the buffer memory; and
(iii) transfer data from buffer memory to the host interface when the streaming of data from the nonvolatile memory device to the host interface has been completed;
wherein the circuit is coupled to each of the plurality of nonvolatile memory devices via the corresponding flash channels and the circuit is enabled to stream a first portion of sequential data from a nonvolatile memory device on a first flash channel to the host interface via a first-in-first out memory; concurrently transfer a second portion of data from a nonvolatile memory device on a second flash channel to the buffer memory; and transfer data from buffer memory to the host interface when the streaming of the first portion of data from the nonvolatile memory device to the host interface has been completed.

15. A method for accessing flash memory from one or more flash devices by a host computer, comprising:
concurrently directing a stream of data output from one or more flash devices to both a buffer memory and directly to a host interface comprises:
identifying the location of the desired data stored in flash memory;
reading the data from flash memory;
sending the data directly to a host interface without writing the data into a random-access memory (RAM) buffer and simultaneously writing the data to a RAM buffer;
after the data has been sent directly to a host interface, making the data stored in the RAM buffer available for transfer to the host interface;
wherein identifying the location of the desired data stored in flash memory comprises identifying the location of a first portion of sequential data stored in flash memory;
identifying the location of a second sequential portion of desired data stored in flash memory;
reading the second portion of data from flash memory;
writing the data to a second RAM buffer;
after the first portion of data has been sent directly to a host interface, making the second portion of data stored in the second RAM buffer available for transfer to the host interface; and
wherein the first portion of data is stored on flash memory connected to a first flash channel and the second portion of data is stored on flash memory connected to a second flash channel, and in which sending the data directly to a host interface without writing the data into a random-access memory (RAM) buffer comprises:
providing a first DMA engine connected to the first flash channel, the first DMA engine configured to transfer the first portion of data to a first-in-first out memory;
providing a second flash DMA engine connected to a second flash channel, the second DMA engine configured to transfer the second portion of data to a second RAM buffer;
providing a host interface DMA engine, the host interface DMA engine configured to either transfer data from the FIFO to the host interface or to transfer data from the second RAM buffer.

* * * * *